April — B. SHAMSKY 2,676,588
ORTHOPTIC TRAINING DEVICE
Filed April 25, 1950 4 Sheets-Sheet 1

INVENTOR.
BURTON SHAMSKY
BY
ATTORNEYS

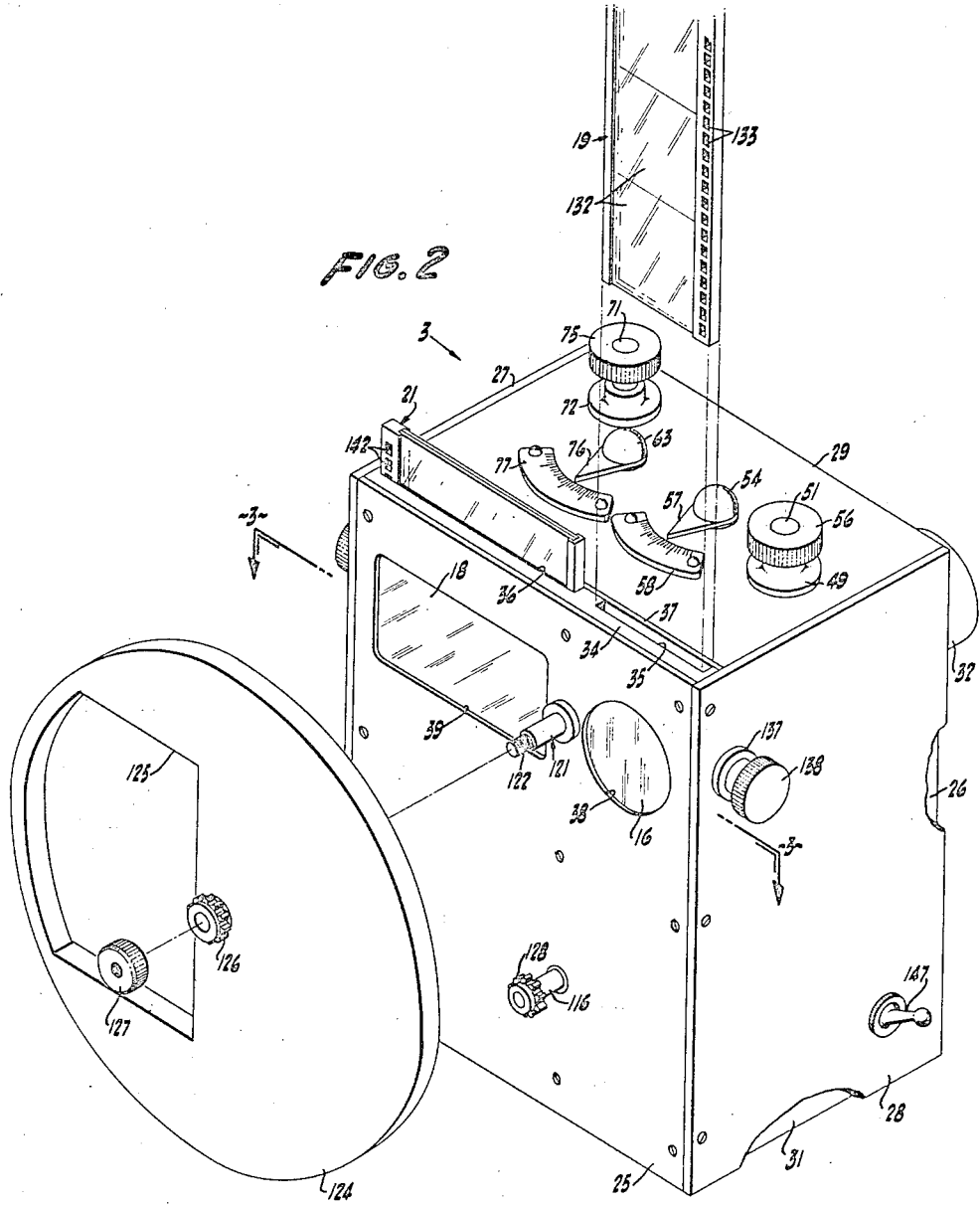

April 27, 1954  B. SHAMSKY  2,676,588
ORTHOPTIC TRAINING DEVICE
Filed April 25, 1950  4 Sheets-Sheet 3
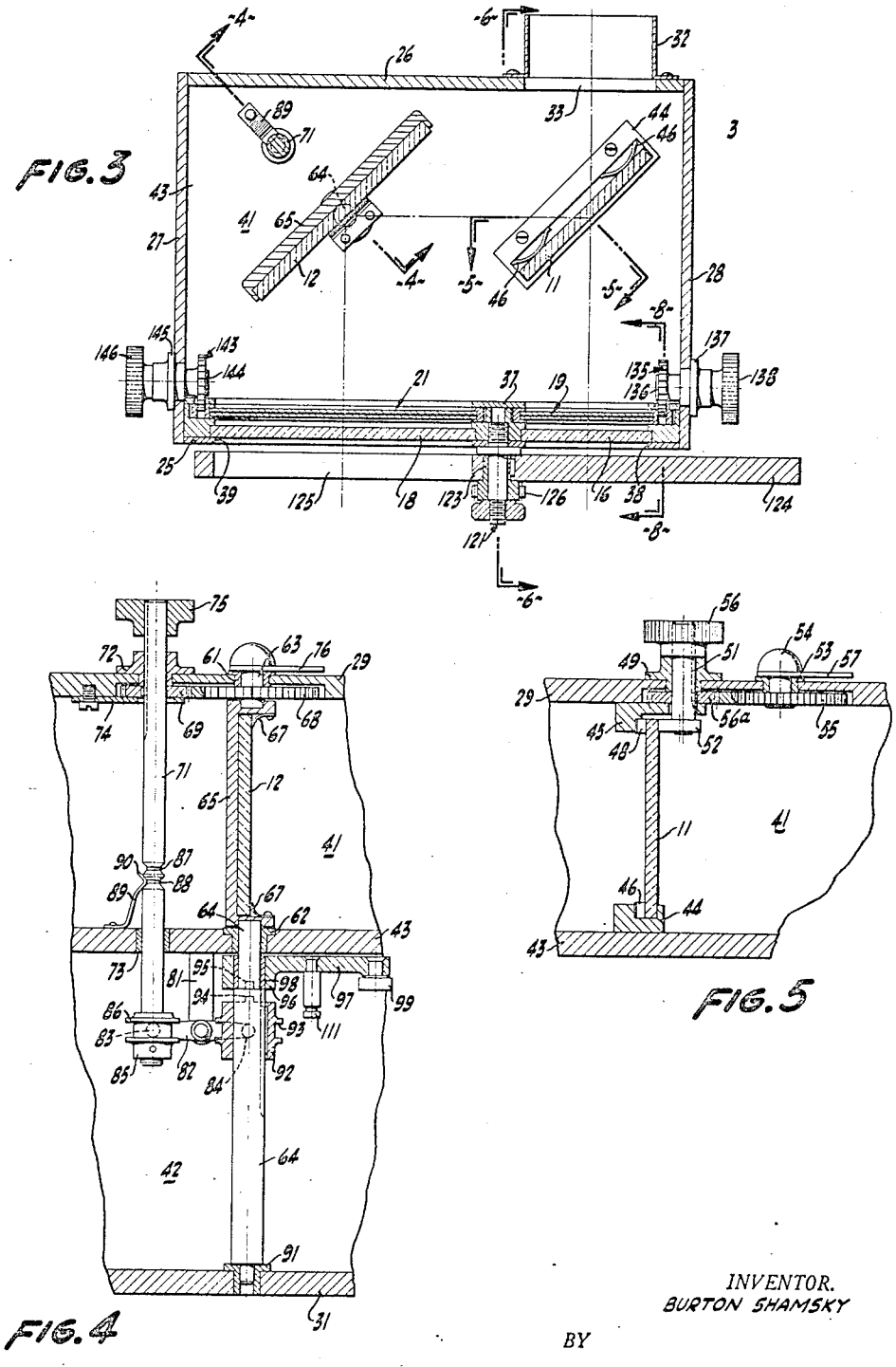
INVENTOR.
BURTON SHAMSKY
BY
Mellin and Hanson
ATTORNEYS April 27, 1954  B. SHAMSKY  2,676,588
ORTHOPTIC TRAINING DEVICE
Filed April 25, 1950  4 Sheets-Sheet 4

INVENTOR.
BURTON SHAMSKY
BY
Mellin and Hanson
ATTORNEYS

Patented Apr. 27, 1954

2,676,588

UNITED STATES PATENT OFFICE 2,676,588

ORTHOPTIC TRAINING DEVICE

Burton Shamsky, Berkeley, Calif.

Application April 25, 1950, Serial No. 157,930

4 Claims. (Cl. 128—76.5)

This invention relates to picture projecting equipment for the orthoptic training of patients and in general has for its object the provision of a projecting system whereby a beam of light emanating from a picture source is split into two distinct beams and whereby these two beams are oppositely polarized and then projected on a screen to be viewed by a patient wearing spectacles having oppositely polarized lenses. When the two frames are so viewed one will be seen only by one eye of the patient and the other by the remaining eye of the patient.

More specifically the object of this invention is the provision of a light analyzer wherein a beam of light emanating from a conventional motion picture projector is split into two distinct beams, wherein the two resulting beams are oppositely polarized and wherein means is provided for selectively varying the directions of said two polarized beams of light relative to each other.

A further object of this invention is the provision of a light analyzer of the character described wherein one of said beams of polarized light may be made continuously to scan a predetermined scan area.

A still further object of this invention is the provision of a light analyzer of the character described provided with one or more light filters for selectively adjusting the intensity of said polarized beams relative to each other.

Another object of this invention is the provision of an analyzer of the character described provided with a shutter for sequentially intercepting said polarized beams of light so that the projected pictures resulting therefrom will be seen alternately by each eye of the patient.

By resorting to a light analyzer of this character a patient or group of patients may be subjected to orthoptic training while viewing an entertaining or educational moving picture film.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form since the invention as set forth in the claims may be embodied in a plurality of forms.

Referring to the drawings:

Fig. 2 is an isometric projection of the light beam splitting, polarizing and filtering assembly diagrammatically illustrated as the central element of Fig. 1.

Fig. 3 is a horizontal section taken on the section line 3—3 of Fig. 2.

Fig. 4 is a vertical fragmentary section taken on the section line 4—4 of Fig. 3.

Fig. 5 is a vertical fragmentary section taken on the section line 5—5 of Fig. 3.

Figure 1:
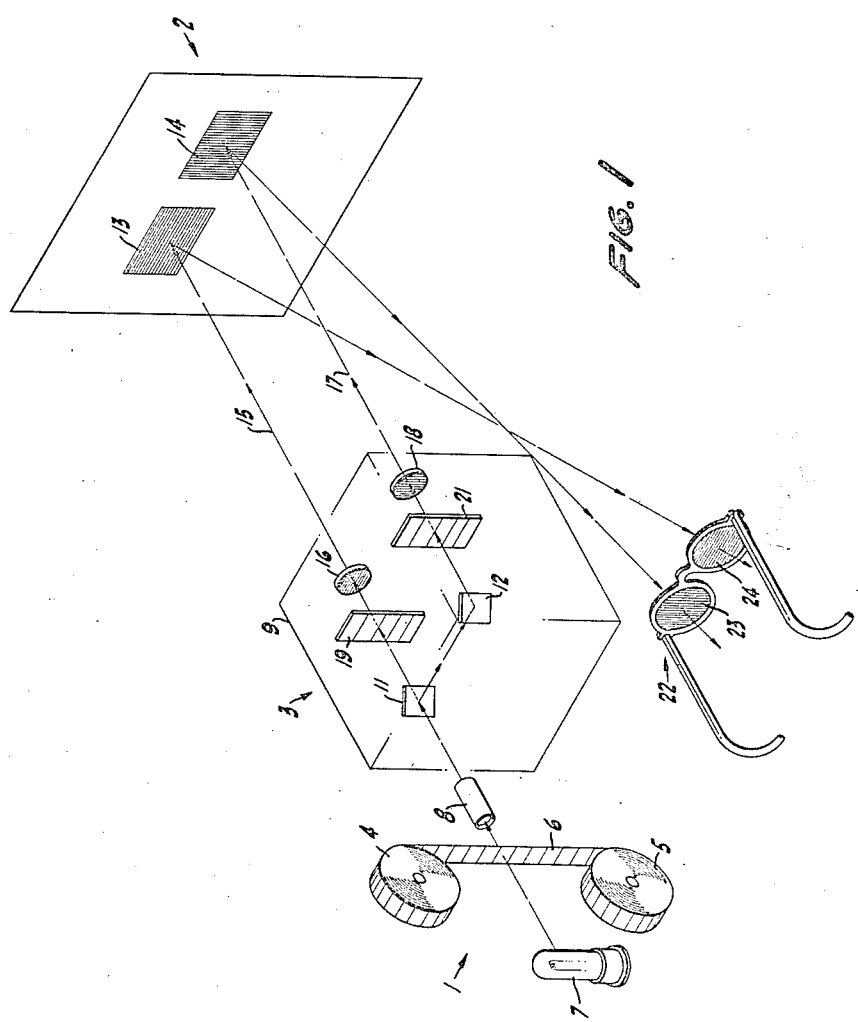
Fig. 1 is a schematic isometric view of a projector and orthoptic training system embodying the objects of my invention.

As schematically shown in Fig. 1, the objects of my invention have been embodied in a system including a standard motion picture projector generally designated by the reference numeral 1, a conventional screen generally designated by the reference numeral 2, and a light analyzer disposed between the projector 1 and the screen 2 and generally designated by the reference numeral 3. Conventionally, the projector 1 includes a pair of reels 4 and 5 for the reception of a strip of film 6, means not shown being provided for actuating these reels, a light source 7 disposed behind the film and a condenser 8 located in front of the film.

The light analyzer 3 includes a casing 9 shown in dot-dash line and mounted within the casing is a half-silvered mirror 11 and a reflector 12, the mirror 11 being in the path of the beam of light emerging from the condenser 8 and making an angle of 45° therewith so that a portion of this beam will pass directly through the mirror to form a frame 13 on the screen 2. A portion of the beam emanating from the condenser 8 is reflected at right angles by the half-silvered mirror to the reflector 12 which in turn reflects it forwardly generally parallel to the first beam so as to form a frame 14 on the screen 2 laterally offset with respect to the frame 13. Disposed in the path of the beam 15 passing through the half-silvered mirror 11 is a polarized transparency 16 and similarly disposed in the path of the beam 17 reflected by the reflector 12 is a polarized transparency 18, these two transparencies being oppositely polarized as indicated by the shade lines thereon, and on the frames 13 and 14. Also located in the path of the beam 15 is a light filter 19 varying in density step by step or progressively. Similarly disposed in the path of the beam 17 is a similar light filter 21.

By resorting to this system a beam of light passing through the condenser and characterized by the film 6 is split into two separate laterally offset and oppositely polarized beams resulting in two laterally offset and oppositely polarized frames on the screen 2. When viewing these frames through spectacles 22 provided with oppositely polarized lenses 23 and 24, a patient will see the frame 13 only through one eye and the other frame 14 only through the other eye, depending upon the relative polarization of the lenses 23 and 24 with respect to the frames 13 and 14.

The casing 9 includes forward and rear walls 25 and 26, side walls 27 and 28, a top 29 and a bottom 31. Mounted on the rear wall 26 is an outwardly extending collar 32 in registration with an aperture 33 formed in the rear wall and arranged to be placed in axial alignment with the condenser 8 of the motion picture projector 1. Screwed to the inner face of the front wall 25 is an intermediate panel 34 provided with a pair of vertical channels 35 and 36. Fastened to the rear face of the intermediate panel 34 is a plate 37 serving to close the channels 35 and 36. Formed in the front wall 25 and in the plate 37 are circular apertures 38 in axial alignment with the collar 32. Similarly formed in the front wall 25 and in the plate 37 in horizontal alignment with the apertures 38 are rectangular windows 39.

Dividing the analyzer 3 into upper and lower chambers 41 and 42 is a horizontal partition 43 fastened to the side walls 27 and 28. Fastened to the partition 43 (see Figs. 3 and 5) is a channel 44 disposed at an angle of approximately 45° with respect to the axis of the collar 32 and the aperture 33. Similarly fastened to the lower face of the top 29 in alignment with the channel 44 is an angle 45. Seated within the channel 44 and resiliently held therein by a spring 46 is the half-silvered mirror 11 forming one element of the analyzer 3 schematically indicated in Fig. 1. Mounted in the angle 45 is a spring 48 engaging the upper end of the mirror 11. Mounted in the top 29 is a flanged bearing bushing 49 and journaled in this bushing is a pin 51. Keyed to the lower end of the pin 51 is a cam 52 arranged to engage the rear face of the half-silvered mirror 11 and to thereby determine the inclination of this mirror. Mounted on the top 29 adjacent the bushing 49 is a bushing 53 and journaled in this bushing is a round-headed stud 54. Fastened to the lower end of this stud is a gear 55 arranged to mesh with a gear 56a keyed to the pin 51. Fixed to the upper end of the pin 51 is a knurled button 56 for rotating the pin 51 and indirectly the gear 55. Also fixed to the stud 54 is a pointer 57 arranged to sweep over a suitably calibrated scale 58 fastened to the upper face of the top 29. By resorting to this construction the vertical angularity of the half-silvered mirror 11 can be determined without having to look within the analyzer.

Mounted in the top 29 and in the partition 43 are vertically aligned bushings 61 and 62 and journaled respectively in these bushings are pins 63 and 64. Fastened to the opposed ends of these pins is a mirror frame 65 and mounted in this frame is a mirror 12, spring clips 67 serving to hold the mirror in its proper position. For the purpose of adjusting the horizontal angularity of the mirror 12 there is fixed to the upper pin 63 a gear 68 arranged to mesh with a gear 69. The gear 69 is keyed to a pin 71 journaled at its upper end in a bushing 72 and at its lower end in a bushing 73 mounted in the partition 43. Fastened to the lower face of the top 29 is a plate 74 serving to retain the gear 69 in place, the shaft 71 being vertically movable with respect thereto. Fixed to the upper end of the pin 71 is a knurled button 75 for imparting rotation to the gear 69 and through the gear 69 to the gear 68. Fastened to the upper end of the pin 63 is a pointer 76 arranged to sweep over a suitably calibrated scale 77 fastened to the upper face of the top 29.

Secured to and depending from the partition 43 is a bracket 81 and pivoted to the lower end of this bracket is a rocker arm 82 provided with forked ends 83 and 84. Fixed to the lower end of the pin 71 is a collar 85 formed with an annular saddle 86 arranged to accommodate the fork 83. Formed intermediate the ends of the pin 71 are a pair of notches 87 and 88 arranged to selectively receive the free end of a spring 89 fastened to the partition 43. As a result of this construction it can be seen that by applying a downward force to the knurled button 75 the shaft 71 may be moved downwardly until the detent 90 of the spring 89 is seated in the upper notch 87 and that as a result of the downward movement of the pin 71 the fork 84 will simultaneously move upwardly. The lower end of the pin 64 is journaled in a bushing 91 mounted in the bottom 31 of the analyzer. Keyed to the pin 64 adjacent the fork 84 and slidable thereon is a sleeve 92 provided with an annular saddle 93 for the accommodation of the fork 84. Formed on the upper end of the sleeve 92 are diametrically opposed radial ribs 94 receivable, upon the upward movement of the sleeve 92, in complementary radial slots 95 formed in the hub 96 of a cam arm 97. The hub 96 is journaled to the pin 64 by a bushing 98 fixed to the hub 96. To prevent the downward movement of the hub 96 the shaft pin 64 is stepped at this point to form a shoulder for supporting the bushing 98 and consequently the hub which is affixed thereto. Fastened to the free end of the cam lever 97 is a cam follower roller 99.

Figure 6:
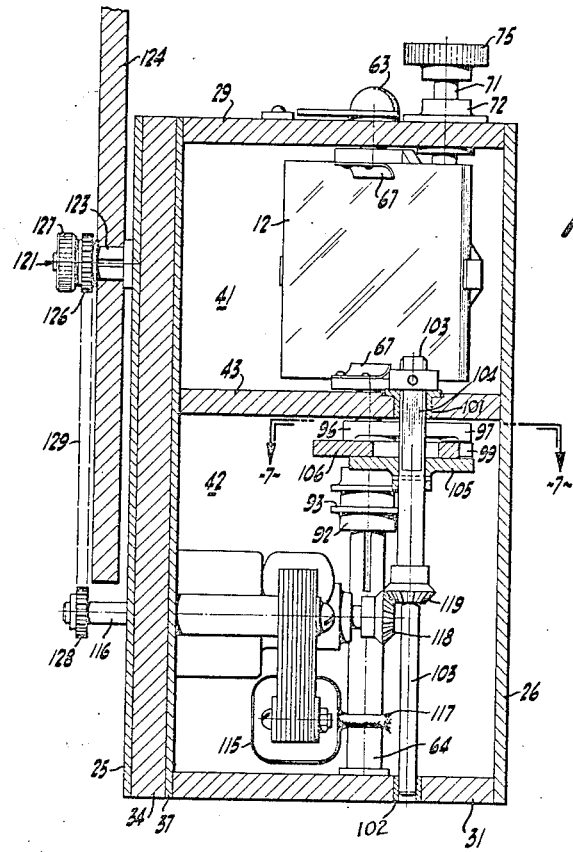
Fig. 6 is a vertical section taken on the section line 6—6 of Fig. 3.
Figure 7:
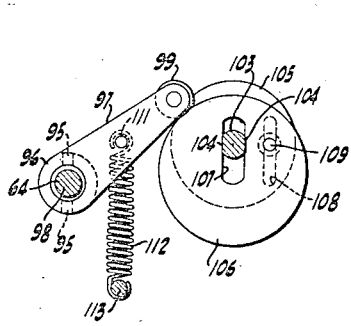
Fig. 7 is a horizontal fragmentary section taken on the section line 7—7 of Fig. 6.
Figure 8:
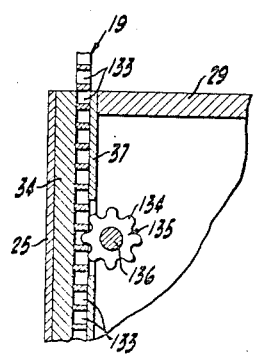
Fig. 8 is a vertical fragmentary section taken on the section line 8—8 of Fig. 3.

Journaled in the partition 43 and bottom 31 respectively in bushings 101 and 102 is a shaft 103 (see Fig. 6) provided with opposed flat faces 104 at its upper end. Fastened to the shaft 103 is a supporting disc 105 and seated on this disc is a circular cam plate 106 provided with a diametrically disposed slot 107 for the accommodation of the shaft 103 at a point adjacent its flat faces 104. The width of the slot 107 should be substantially that of the shaft 103 across its flat-faced portion so that the only movement of which the cam plate is capable is a diametrical movement relative to the shaft 103. For the purpose of locking the cam plate 106 in any predetermined position relative to the shaft 103 the supporting disc 105 is provided with a slot 108 substantially parallel to the slot 107 and extending upwardly through this slot and threaded into the lower face of the cam plate 106 is a screw 109. The shaft 103 and its associated circular cam plate 106 are so located relative to the cam follower roller 99 that the latter engages the outer periphery of the cam plate 106. Secured to the cam arm 97 is a pin 111 and fastened to the lower end of this pin is one end of a coil spring 112, the opposite end of the spring being fastened to a pin 113 secured to and extending downwardly from the partition 43. As a result of the above construction it will be seen that if the shaft 71 is depressed so that the detent 90 is accommodated in the upper notch 87 the ribs 94 will seat in the grooves or slot 95 to key the shaft 64 to the hub 96, this construction therefore serving as a clutch. As a consequence of the oscillatory movement imparted to the shaft 64 due to the movement of the cam follower roller in response to the eccentric rotation of the cam disc 106 the mirror will be caused to scan a predetermined scan area on the screen.

Mounted within the lower compartment 42 to the front wall 25 is an electric motor 115 including a drive shaft 116 and a power lead 117. Secured to the inner end of the shaft 116 is a bevel gear 118 arranged to mesh with the bevel gear 119 fixed to the shaft 103. Rotation of the shaft 116 will therefore impart rotation to the shaft 103 and to its associated eccentrically disposed circular cam disc 106. Fastened to the wall 25 between the apertures 38 and 39 is a flanged pin 121 (see Fig. 2) having a threaded outer end 122. Journaled on this pin by a bushing 123 is a circular light shutter 124 provided with a generally rectangular opening 125. Fastened to the shutter 124 in axial alignment with the pin 121 is a sprocket wheel 126 and threaded to the outer end of the pin is a knurled nut 127 arranged to seat against the shoulder of the pin. Passing over the sprocket wheel 126 and a sprocket wheel 128 fixed to the shaft 116 is a sprocket chain 129. As a result of this construction the shutter 124 is driven by the motor 115 which, as above indicated, also serves to drive the eccentrically disposed circular cam disc 106. The shutter 124 can of course be removed whenever desired by merely unscrewing the knurled nut 127 and disengaging the chain 129 from the sprocket wheel 128.

Accommodated within the analyzer channel 35 is the light filter 19, preferably formed of a number of separate transparent panels 132 of progressively increasing density. The outer edge of this filter is provided with perforations 133 for the accommodation of the teeth 134 of a sprocket 135, this sprocket 135 being fixed to the inner end of a pin 136 journaled in a bushing 137 fastened to the side wall 28. Affixed to the outer end of the pin is a knurled button 138 serving as means for determining the vertical position of the filter 19 relative to the circular aperture 38. Similarly disposed in the channel 36 is the filter 21 preferably of sectionalized construction and provided along its outer vertical edge with perforations 142 for the reception of the teeth of a sprocket 143. The sprocket 143 is fixed to a pin 144 journaled in a bushing 145 mounted in the side wall 27. Affixed to the outer end of the pin 144 is a knurled button 146 serving to control the vertical position of the filter 21 relative to the rectangular aperture 39.

From an inspection of Fig. 2 it will be noted that the shutter window 125 is of such dimensions as to encompass the rectangular aperture 39 as well as the circular aperture 38. Also as indicated in this figure the analyzer is provided with an on-and-off switch 147 arranged to be placed in circuit with the lead 117 and with a suitable source of electric power.

Clamped between the front wall 25 of the analyzer and the intermediate panel 34 in registration with the aperture 38 is the polarized transparency 16 and similarly clamped between the front wall 25 and the intermediate wall 34 in registration with the rectangular aperture 39 is the polarized transparency 18. As previously described, these two transparencies are oppositely polarized to produce the oppositely polarized frames 13 and 14 on the screen 2.

From this description it will be seen that the analyzer 3 serves as a means whereby a beam emanating from the condenser of a moving picture projector may be split into two separate beams of oppositely polarized light to form two independent oppositely polarized frames on the screen 2 and whereby the relative intensity of these two beams may be adjusted as desired by means of the filters 19 and 21. To adjust the elevation of the frame 14 it is merely necessary to tilt the half-silvered mirror 11, this being accomplished by rotation of the knurled button 56. The lateral position of the frame 14 relative to the frame 13 may be adjusted by rotating the knurled button 75 through any determined angle as reflected by the pointer 76 thereby to cause a corresponding rotation of the mirror 12 on its vertical axis. When it is desired to cause the mirror 12 to scan a predetermined scan area to thereby cause the frame 14 to move laterally across the screen it is merely necessary to depress the button 75 to cause the notch 87 of the shaft 71 to be engaged by the detent 90 of the spring 89. As previously explained, this results in a clutching action between the sleeve 92 and the hub 96 to thereby impart to the shaft 64 the oscillatory movement of the cam arm 97. Concurrently with this scanning action of the mirror 12 it is possible to have the shutter 124 continuously rotate so as to cause the frames 13 and 14 to be intermittently and alternately projected on the screen 2.

I claim:

1. An orthoptic training system comprising: a picture projector; a projector screen; and a light analyzer disposed between said projector and said screen; said analyzer including: a half-silvered mirror and a reflector arranged to receive a beam of light from said projector and to split said beam into two separate and laterally offset beams directed toward said screen; oppositely polarized transparencies disposed in the path of said separated beams; a light shutter disposed in the path of each of said laterally offset beams whereby said oppositely polarized, laterally offset beams alternately produce polarized offset frames on said screen.

2. A light analyzer comprising: a casing provided with a light receiving aperture; first means mounted in said casing and including a half-silvered mirror and a reflector operatively associated to split a beam of light entering said aperture into two separate and laterally offset beams; second means associated with said first means for continuously causing said reflector to oscillate through a predetermined angle; and a polarized transparency disposed in the path of each of said offset beams; said transparencies being oppositely polarized.

3. A device of the class described comprising: a casing providing a light receiving aperture; first means mounted in said casing and including a half-silvered mirror and a reflector operatively associated to split a beam of light entering said aperture into two separate and laterally offset beams; second means associated with said first means for continuously causing said reflector to oscillate through a predetermined angle; and a polarized transparency, disposed in the path of each of said offset beams; said transparencies being oppositely polarized; said second means including a clutch to enable inactivation of said reflector.

4. A device of the class described comprising: a casing providing a light receiving aperture; first means mounted in said casing and including a half-silvered mirror and a reflector operatively associated to split a beam of light entering said aperture into two separate and laterally offset beams; second means associated with said first means for continuously causing said reflector to oscillate through a predetermined angle; a polarized transparency disposed in the path of each of said offset beams; said transparencies being oppositely polarized; said second means including a clutch to enable inactivation of said reflector; and means for adjusting the angular position of the reflector relative to the mirror when the clutch is disengaged.

References Cited in the file of this patent

UNITED STATES PATENTS

| Number | Name | Date |
|---|---|---|
| 1,595,984 | Ames, Jr. | Aug. 17, 1926 |
| 1,794,103 | Cubitt | Feb. 24, 1931 |
| 1,909,222 | Pettie | May 16, 1933 |
| 2,019,550 | Turville | Nov. 5, 1935 |
| 2,114,060 | Oakley | Apr. 12, 1938 |
| 2,149,148 | Rones | Feb. 28, 1939 |
| 2,178,145 | Manly | Oct. 31, 1939 |
| 2,213,484 | Briggs | Sept. 3, 1940 |
| 2,238,207 | Ames et al. | Apr. 15, 1941 |
| 2,282,947 | Sherbinin | May 12, 1942 |
| 2,301,254 | Carnahan | Nov. 10, 1942 |
| 2,362,588 | Shepard | Nov. 14, 1944 |

FOREIGN PATENTS

| Number | Country | Date |
|---|---|---|
| 230,120 | Great Britain | Mar. 9, 1925 |